(12) United States Patent
Jiang

(10) Patent No.: US 11,546,781 B2
(45) Date of Patent: Jan. 3, 2023

(54) INFORMATION REPORTING AND CONFIGURATION METHOD AND DEVICE, USER EQUIPMENT AND BASE STATION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 127 days.

(21) Appl. No.: 17/011,306

(22) Filed: Sep. 3, 2020

(65) Prior Publication Data

US 2020/0404517 A1    Dec. 24, 2020

Related U.S. Application Data

(63) Continuation of application No. PCT/CN2018/080951, filed on Mar. 28, 2018.

(51) Int. Cl.
| | | |
|---|---|---|
| H04L 12/26 | (2006.01) | |
| H04W 24/04 | (2009.01) | |
| H04W 76/18 | (2018.01) | |
| H04W 4/029 | (2018.01) | |

(52) U.S. Cl.
CPC .......... *H04W 24/04* (2013.01); *H04W 4/029* (2018.02); *H04W 76/18* (2018.02)

(58) Field of Classification Search
CPC ......... H04L 45/28; H04L 45/22; H04L 29/14; H04L 45/00; H04L 12/2422; H04W 24/04; H04W 4/029; H04W 76/18; H04W 4/20; H04W 4/02; H04W 76/15; H04W 76/19; H04W 52/0254; H04W 24/10; H04W 52/0225; H04W 76/25; Y02D 30/70
See application file for complete search history.

(56) References Cited

U.S. PATENT DOCUMENTS

| | | | |
|---|---|---|---|
| 8,588,169 B2 | 11/2013 | Dinan | |
| 11,218,926 B2* | 1/2022 | Xu | H04W 36/305 |
| 11,425,581 B2* | 8/2022 | Teyeb | H04W 76/15 |
| 2013/0188473 A1 | 7/2013 | Dinan | |
| 2014/0317456 A1* | 10/2014 | Kim | H04L 43/0847 714/48 |
| 2014/0370914 A1* | 12/2014 | Jung | H04W 4/02 455/456.1 |
| 2015/0098448 A1* | 4/2015 | Xu | H04W 36/0079 370/331 |

(Continued)

FOREIGN PATENT DOCUMENTS

| | | | | |
|---|---|---|---|---|
| CA | 3057416 A1 * | 9/2018 | | H04W 28/085 |
| CN | 105744626 A | 7/2016 | | |

(Continued)

OTHER PUBLICATIONS

International Search Report in the international application No. PCT/CN2018/080951, dated Jan. 3, 2019.

(Continued)

*Primary Examiner* — Phuongchau Ba Nguyen
(74) *Attorney, Agent, or Firm* — Syncoda LLC; Feng Ma

(57) ABSTRACT

An information reporting method includes: determining that a secondary cell group (SCG) failure occurs; reporting SCG failure-related information to the base station, the SCG failure related information including location information of user equipment (UE).

12 Claims, 12 Drawing Sheets

(56) References Cited

U.S. PATENT DOCUMENTS

| | | | | |
|---|---|---|---|---|
| 2016/0192249 | A1* | 6/2016 | Wu | H04W 76/19 |
| | | | | 370/331 |
| 2016/0227524 | A1* | 8/2016 | Choi | H04L 5/00 |
| 2017/0238221 | A1 | 8/2017 | Santhanam et al. | |
| 2020/0022215 | A1* | 1/2020 | Takahashi | H04W 76/27 |
| 2020/0029356 | A1 | 1/2020 | Choi et al. | |
| 2022/0022058 | A1* | 1/2022 | Fang | H04W 74/0833 |
| 2022/0078646 | A1* | 3/2022 | Xu | H04W 76/15 |

FOREIGN PATENT DOCUMENTS

| | | | | |
|---|---|---|---|---|
| CN | 106332114 | A | | 1/2017 |
| CN | 107210888 | A | | 9/2017 |
| CN | 107690162 | A | | 2/2018 |
| CN | 111869307 | A * | 10/2020 | ............ H04W 24/02 |
| CN | 112789878 | A * | 5/2021 | ............ H04W 24/02 |
| EP | 3512247 | B1 * | 12/2021 | ............ H04W 24/10 |
| GB | 2566987 | A * | 4/2019 | ............ H04W 24/10 |
| WO | 2018028969 | A1 | | 2/2018 |

OTHER PUBLICATIONS

First Office Action of the Chinese application No. 201880000531.7, dated Dec. 4, 2019.

3GPP TS 36.321 V15.0.0 (Dec. 2017), 3rd Generation Partnership Project; Technical Specification Group Radio Access Network; Evolved Universal Terrestrial Radio Access (E-UTRA); Medium Access Control (MAC) protocol specification (Release 15).

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15).

English translation of the Written Opinion of the International Search Authority in the international application No. PCT/CN2018/080951, dated Jan. 3, 2019.

Ericsson:"Secondary Radio Link Failure (S-RLF)",3GPP Draft; R2-141542—Secondary Radio Link Failure (S-RLF),3rd Generation Partnership Project (3GPP), Mobile Competence Centre • 650 Route Des Lucioles • F-06921 Sophia-Antipolis Cedex ; France vol. RAN WG2, No. Valencia, Spain; Mar. 31, 2014-Apr. 4, 2014 Mar. 22, 2014(Mar. 22, 2014), XP050792702,Retrieved from the Internet:URL:http://www.3gpp.org/ftp/Meetings_3GPPSYNC/RAN2/Docs/[retrieved on Mar. 22, 2014].

RAN2:"LS on measurement result forwarding from the MN to SN at SCG failure" 3GPP Draft;R2-1801669 LS to RAN3 on Measurement Forwarding at SCG_Failure, 3rd Generation Partnership Project (3GPP),Mobile Competence Centre—650 Route Des Lucioles—F-06921 Sophia-Antipolis Ced vol. RAN WG2, No. Vancouver, Canada; Jan. 22, 2018-Jan. 26, 2018 Jan. 27, 2018 (Jan. 27, 2018), XP051387090, Retrieved from the Internet:URL:http://www.3gpp.org/ftp/tsg%5Fran/WG2%5FRL2[retrieved on Jan. 27, 2018].

Supplementary European Search Report in European application No. 18913189.9, dated Sep. 7, 2021.

* cited by examiner

INFORMATION REPORTING AND CONFIGURATION METHOD AND DEVICE, USER EQUIPMENT AND BASE STATION

CROSS-REFERENCE TO RELATED APPLICATION

This is a continuation of International Application No. PCT/CN2018/080951 filed on Mar. 28, 2018, the disclosure of which is hereby incorporated by reference in its entity.

BACKGROUND

With the rapid development of wireless communication technologies, Long-Term Evolution (LTE) introduces Minimization of Drive Test (MDT) technology to facilitate network troubleshooting. The MDT technology supports idle state and connected state. For user equipment (UE) in a connected state, the network can configure the UE to report the location information of the UE while conducting the measurement report to help the network know the signal quality at each location. Furthermore, the UE in the connected state also needs to report the location information of the UE when a Radio Link Failure (RLF) or a handover failure occurs in a Master Cell Group (MCG).

SUMMARY

The present disclosure generally relates to the field of communication technologies, and more specifically, to an information reporting method and apparatus, an information configuration method and apparatus, user equipment, a base station, and a computer-readable storage medium.

According to a first aspect of embodiments of the present disclosure, there is provided an information reporting method, applied in user equipment (UE), the method including: determining that a secondary cell group (SCG) failure occurs; and reporting information related to the SCG failure to a base station, the information related to the SCG failure including location information of the UE.

According to a second aspect of embodiments of the present disclosure, there is provided an information configuration method, applied in base station, the method including: determining that user equipment (UE) is in a connected state, and configuring a secondary cell group (SCG) for the UE; and receiving information related to an SCG failure, which is reported by the UE when the SCG failure occurs, the information related to the SCG failure including location information of the UE.

According to a third aspect of embodiments of the present disclosure, there is provided an information reporting apparatus, including: a processor; and memory configured to store instructions executable by the processor, wherein the processor is configured to: determine that a secondary cell group (SCG) failure occurs; and report information related to the SCG failure to a base station, the information related to the SCG failure including location information of the UE.

According to a forth aspect of embodiments of the present disclosure, there is provided an information reporting apparatus, including: a processor; and memory configured to store instructions executable by the processor, wherein the processor is configured to: determine that UE is in a connected state, and configure a secondary cell group (SCG) for the UE; and receive information related to an SCG failure, which is reported by the UE when the SCG failure occurs, the information related to the SCG failure including location information of the UE.

It is to be understood that the above general description and the following detailed description are only exemplary and explanatory, and do not limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
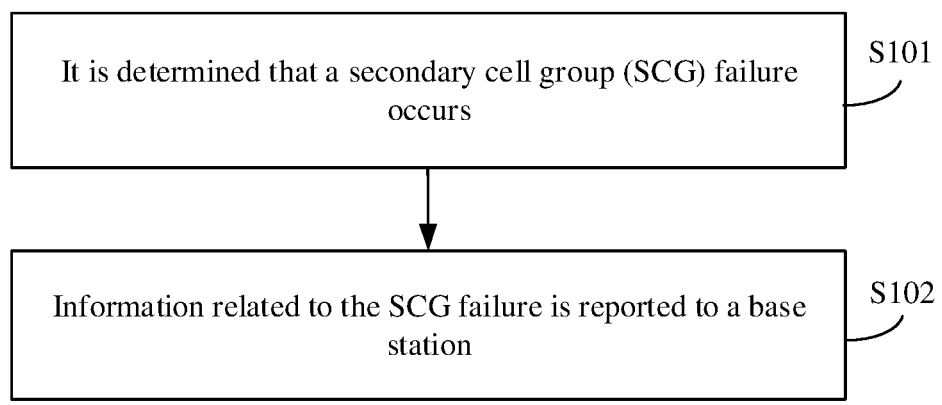
FIG. 1 is a flowchart of an information reporting method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

When a Secondary Cell Group (SCG) failure occurs, although the UE reports information related to the SCG failure to the network, the UE does not report the UE location information at the same time. If the network wants to know the location of the SCG failure, it must obtain the location through the measurement report of the UE. That is, acquisition of the location is implemented by instructing the UE by the network to report the UE's location information in the measurement report configuration of the UE. But it is very power-consuming when the UE frequently reports its location information. That is, this configuration will increase power consumption of the UE.

FIG. 1 is a flowchart of an information reporting method according to some embodiments of the present disclosure. This embodiment is described from the UE side. As shown in FIG. 1, the information reporting method includes the following operations S101 to S102.

In operation S101, it is determined that a secondary cell group (SCG) failure occurs.

In operation S102, information related to the SCG failure is reported to a base station, the information related to the SCG failure including location information of UE.

Herein, after determining that the SCG failure occurs, the UE reports the information related to the SCG failure to the base station. The information related to the SCG failure includes the UE's location information. That is, after determining that the SCG failure occurs, the UE reports the location information and thus UE does not need to report the location information frequently, thereby reducing power consumption of the UE.

In the above embodiment, the location information is reported after it is determined that the SCG failure occurs, and the location information does not need to be reported frequently, thereby reducing power consumption of the UE.

Figure 2:
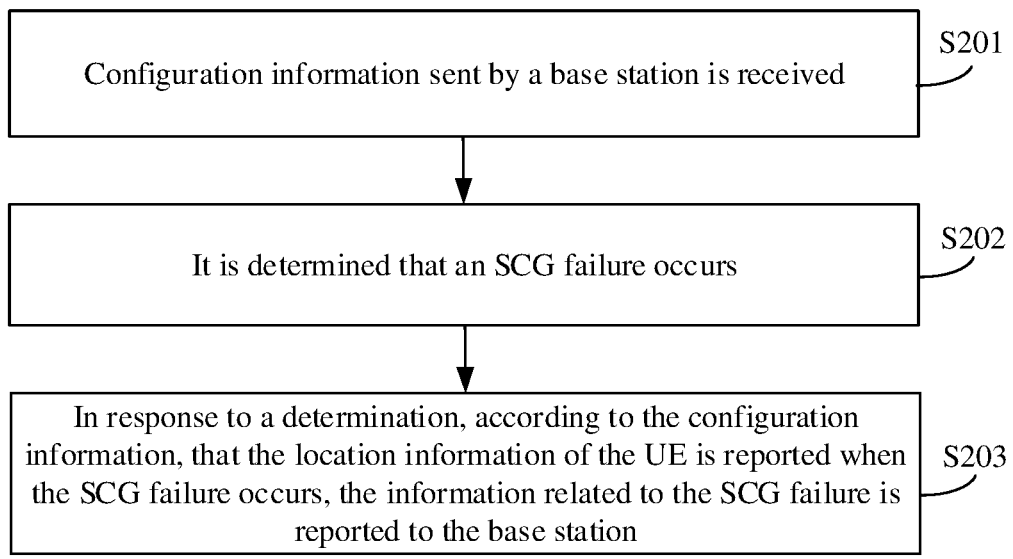
FIG. 2 is a flowchart of another information reporting method according to some embodiments of the present disclosure.

FIG. 2 is a flowchart of another information reporting method according to some embodiments of the present disclosure. As shown in FIG. 2, the information reporting method includes the following operations S201 to S203.

In operation S201, configuration information sent by a base station is received, the configuration information including whether to report the location information of the UE when an SCG failure occurs.

According to some embodiments, the base station may configure whether to report the location information of the UE when SCG failure occurs.

According to some embodiments, the configuration information may also include whether to obtain global navigation satellite system (GNSS) location information when reporting the location information of the UE. That is, the UE may further configure whether to acquire the GNSS location when reporting the location information of the UE.

In operation S202, it is determined that an SCG failure occurs.

In operation S203, in response to a determination, according to the configuration information, that the location information of the UE is reported when the SCG failure occurs, the information related to the SCG failure is reported to the base station, the information related to the SCG failure including the location information of the UE.

After it is determined, according to the received configuration information, that the location information of the UE has been reported when the SCG failure occurs, the UE may report the information related to the SCG failure to the base station, the information related to the SCG failure including the location information of UE.

If the configuration information also includes whether to obtain the GNSS location information when the location information of the UE is reported, the GNSS location information is obtained and is added into the location information of the UE, in response to that the UE determines, according to the configuration information, to obtain the GNSS location information when reporting the location information of the UE.

In the above embodiment, the information related to the SCG failure, which includes the location information, is reported to the base station after it is determined according to the configuration information that the location information of the UE is reported when the SCG failure occurs. That is, the UE does not need to report the location information frequently, thereby reducing power consumption of the UE.

Figure 3:
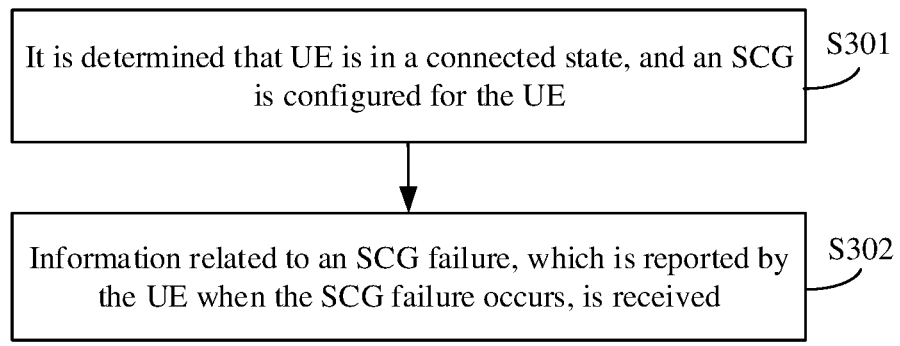
FIG. 3 is a flowchart of an information configuration method according to some embodiments of the present disclosure.

FIG. 3 is a flowchart of an information configuration method according to some embodiments of the present disclosure. This embodiment is described from the base station side. As shown in FIG. 3, the method includes the following operations S301 to S302.

In operation S301, it is determined that UE is in a connected state, and an SCG is configured for the UE.

For an UE in a connected state, the base station may configure SCG for the UE.

In operation S302, information related to an SCG failure, which is reported by the UE when the SCG failure occurs, is received, the information related to the SCG failure including location information of the UE.

After it is determined that the SCG failure occurs, the UE reports the information related to the SCG failure, which includes the location information of the UE, to the base station to help the network know the signal quality of each location.

In the above embodiment, by receiving the information (including the location information of the UE) related to the SCG failure, which is reported by the UE when the SCG failure occurs, the base station does not need to instruct to report the location information of the UE in the measurement report configuration, and the UE does not need to report the location frequently, thereby reducing power consumption of the UE.

Figure 4:
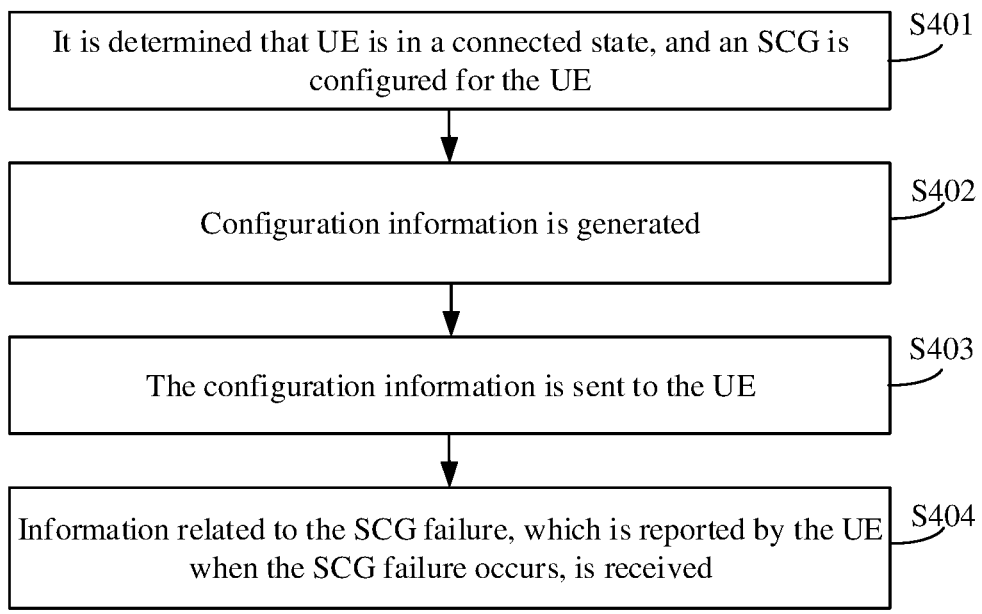
FIG. 4 is a flowchart of another information configuration method according to some embodiments of the present disclosure.

FIG. 4 is a flowchart of another information configuration method according to some embodiments of the present disclosure. As shown in FIG. 4, the method includes the following operations S401 and S404.

In operation S401, it is determined that UE is in a connected state, and an SCG is configured for the UE.

In operation S402, configuration information is generated, which includes whether to report the location information of the UE when an SCG failure occurs.

For an UE in a connected state, the base station can configure the SCG for the UE. According to some embodiments, the base station may generate configuration information for the UE, the configuration information including whether to report the location information of the UE when the SCG failure occurs.

According to some embodiments, the configuration information may further include whether to obtain GNSS location information when the location information of the UE is reported.

In operation S403, the configuration information is sent to the UE.

In operation S404, the information related to the SCG failure, which is reported by the UE when the SCG failure occurs, is received. The information related to the SCG failure is sent after the UE determines according to the configuration information that the location information of the UE is reported when the SCG failure occurs. The information related to the SCG failure includes the location information of the UE.

After determining, according to the received configuration information, that the location information of UE is reported when the SCG failure occurs, the UE may report the information related to the SCG failure, which includes the location information of the UE, to the base station to help the network know the signal quality of each location.

If the configuration information further includes acquiring GNSS location information when the location information of the UE is reported, the location information of the UE may include GNSS location information, That is, the network side may acquire GNSS location information.

In the above embodiment, by receiving the information related to the SCG failure, which is reported after it is determined according to the configuration that the location information of the UE is reported when the SCG failure occurs, and which includes the location information of the UE, the base station does not need to instruct to report the location information of the UE in the measurement report configuration information, and the UE does not need to report location information frequently, thereby reducing power consumption of the UE.

Figure 5:
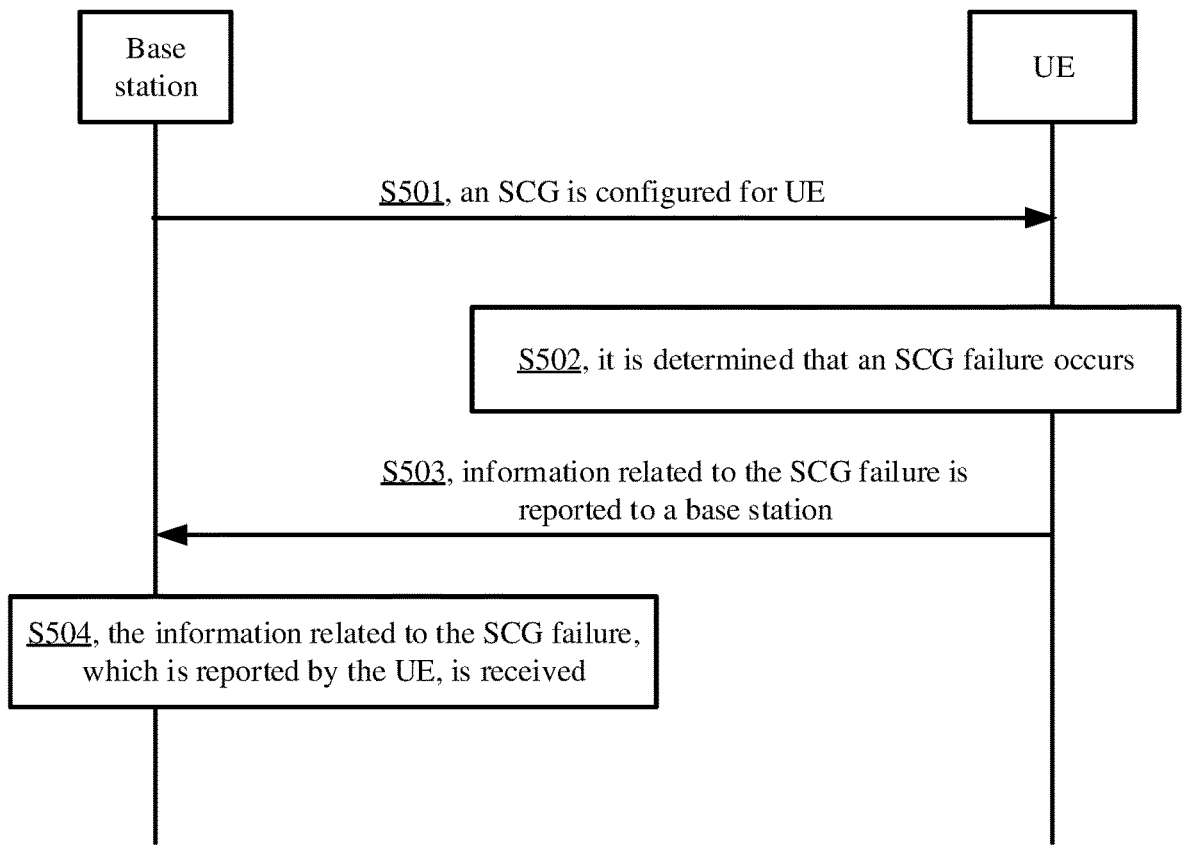
FIG. 5 is a signaling flowchart of an information reporting method according to some embodiments of the present disclosure.

FIG. 5 is a signaling flowchart of an information reporting method according to some embodiments of the present disclosure. This embodiment is described from the perspective of interaction between UE and a base station. As shown in FIG. 5, the information reporting method includes:

In operation S501, the base station determines that the UE is in a connected state, and configures the SCG for the UE.

In operation S502, the UE determines that an SCG failure occurs.

In operation S503, the UE reports information related to the SCG failure to the base station, the information related to the SCG failure including location information of the UE.

In operation S504, the base station receives the information related to the SCG failure, which is reported by the UE.

In the above embodiment, the interaction between the base station and the UE allows the UE to report the location information after it is determined that the SCG failure occurs, without having to report the location information frequently, thereby reducing the power consumption of the UE.

Figure 6:
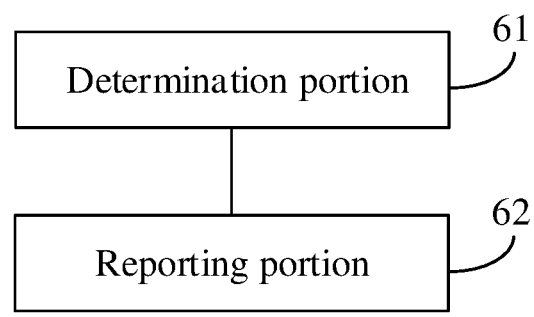
FIG. 6 is a block diagram of an information reporting apparatus according to some embodiments of the present disclosure.

FIG. 6 is a block diagram of an information reporting apparatus according to some embodiments of the present disclosure. The apparatus may be located in a UE. As shown in FIG. 6, the apparatus includes a determination portion 61 and a reporting portion 62.

The determination portion 61 is configured to determine that an SCG failure occurs.

The reporting portion 62 is configured to report the information related to the SCG failure to the base station after the determination portion 61 determines that the SCG failure occurs, the information related to the SCG failure including the location information of the UE.

Herein, after the determining portion 61 determines that the SCG failure occurs, the reporting portion 62 reports the information related to the SCG failure to the base station. The information related to the SCG failure includes the location information of the UE. That is, the UE reports the location information after it is determined that the SCG failure occurs. Thus, there is no need to frequently report location information, thereby reducing power consumption of the UE.

In the above embodiment, the location information is reported after it is determined that the SCG failure occurs, thus the location information does not need to be reported frequently, thereby reducing power consumption of the UE.

Figure 7:
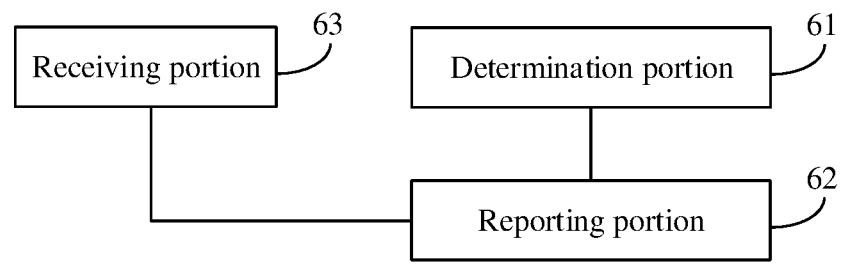
FIG. 7 is a block diagram of another information reporting apparatus according to some embodiments of the present disclosure.

FIG. 7 is a block diagram of another reporting information apparatus according to some embodiments of the present disclosure. As shown in FIG. 7, based on the embodiment shown in FIG. 6, the apparatus may further include a receiving portion 63.

The receiving portion 63 is configured to receive configuration information sent by the base station, the configuration information including whether to report the location information of the UE when the SCG failure occurs.

According to some embodiments, the base station may configure whether to report the location information of the UE when SCG failure occurs.

The reporting portion 62 may be configured to report the information related to the SCG failure to the base station, in response to a determination, according to the configuration information received by the receiving portion 63, that the location information of the UE is reported when an SCG failure occurs.

After it is determined, according to the received configuration information, that the location information of the UE is reported when the SCG failure occurs, the reporting portion 62 may report the information related to the SCG failure to the base station, the information related to the SCG failure including the location information of UE.

In the above embodiment, after it is determined, according to the configuration information, that the location information of the UE is reported when the SCG failure occurs, the information related to the SCG failure, which includes the location information, is reported to the base station. Thus, the UE does not need to report the location information frequently, thereby reducing the power consumption of the UE.

Figure 8:
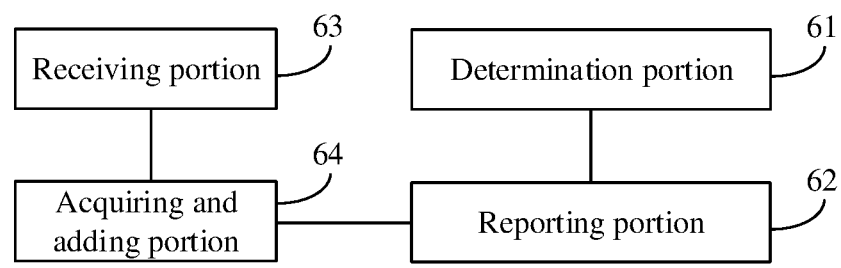
FIG. 8 is a block diagram of another information reporting apparatus according to some embodiments of the present disclosure.

FIG. 8 is a block diagram of another reporting information apparatus according to some embodiments of the present disclosure, wherein the configuration information may further include whether to obtain GNSS location information when the location information of the UE is reported. As shown in FIG. 8, on the basis of the embodiment shown in FIG. 7 above, the apparatus may further include an acquiring and adding portion 64.

The acquiring and adding portion 64 is configured to: in response to a determination, according to the configuration information received by the receiving portion 63, that the GNSS location information is obtained when the location information of the UE is reported, obtain the GNSS location information, and add the GNSS location information into the location information of the UE reported by the reporting portion 62.

In the above embodiment, after it is determined, according to the configuration information, that the GNSS location information is acquired when the location information of the UE is reported, the GNSS location information is acquired and added into the location information of the UE. Thus, the network side can know the GNSS location information.

Figure 9:
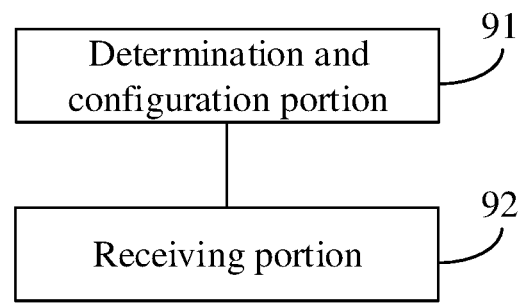
FIG. 9 is a block diagram of an information configuration device according to some embodiments of the present disclosure.

FIG. 9 is a block diagram of an information configuration apparatus according to some embodiments of the present disclosure. The apparatus may be located in a base station. As shown in FIG. 9, the apparatus includes a determination and configuration portion 91, and a receiving portion 92.

The determination and configuration portion 91 is configured to determine that the UE is in a connected state, and configure an SCG for the UE.

For UE in a connected state, the determination and configuration portion 91 may configure an SCG for the UE.

The receiving portion 92 is configured to receive information related to an SCG failure, which is reported by the UE when the SCG failure of the SCG configured by the determination and configuration portion 91 occurs, the information related to the SCG failure including location information of the UE.

After it is determined that the SCG failure occurs, the UE reports the information related to the SCG failure, which includes the location information of the UE, to the base station to help the network know the signal quality at each location.

In the above embodiment, by receiving the information related to the SCG failure, which includes the location information of the UE and is reported by the UE when the SCG failure occurs, the base station does not need to instruct to report the location information of the UE in the measurement report configuration, thus the UE does not need to report the location information frequently, thereby reducing the power consumption of the UE.

Figure 10:
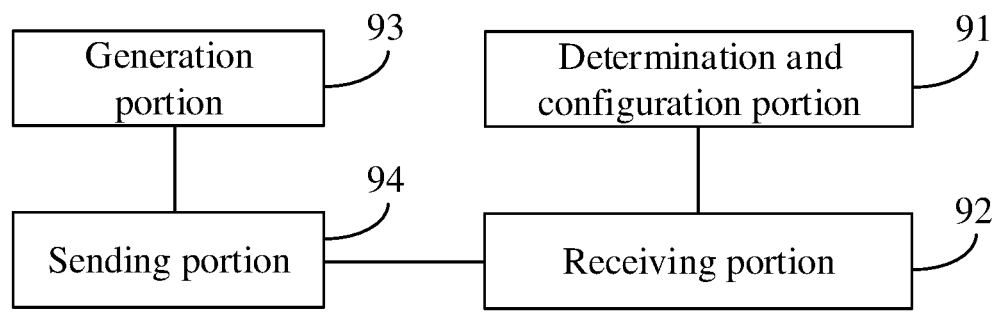
FIG. 10 is a block diagram of another information configuration device according to some embodiments of the present disclosure.

FIG. 10 is a block diagram of another information configuration apparatus according to some embodiments of the present disclosure. As shown in FIG. 10, on the basis of the embodiment shown in FIG. 9, the apparatus may further includes a generation portion 93 and a sending portion 94.

The generation portion 93 is configured to generate configuration information including whether to report the location information of the UE when an SCG failure occurs.

For an UE in connected state, the base station may configure the SCG for the UE. According to some embodiments, the base station may generate configuration information for the UE. The configuration information includes whether to report the location information of the UE when the SCG failure occurs.

According to some embodiments, the configuration information may further include whether to obtain GNSS location information when the location information of the UE is reported.

The sending portion 94 is configured to send the configuration information generated by the generating portion 93 to the UE.

Herein, the information related to the SCG failure received by the receiving portion 92 is sent after the UE determines, according to the configuration information sent by the sending portion 94, that the location information of the UE is reported when the SCG failure occurs.

After determining, according to the received configuration information, that the location information of the UE is reported when the SCG failure occurs, the UE may report the information related to the SCG failure, which includes the location information of the UE, to the base station to help the network know the signal quality of each location.

If the configuration information further includes acquiring GNSS location information when the location information of the UE is reported, the location information of the UE may include GNSS location information. That is, the network side may acquire GNSS location information.

In the above embodiment, by receiving the information related to the SCG failure, which is reported after it is determined according to the configuration that the location information of the UE is reported when the SCG failure occurs, and which includes the location information of the UE, the base station does not need to instruct to report the location information of the UE in the measurement report configuration, and the UE does not need to report location information frequently, thereby reducing power consumption of the UE.

Figure 11:
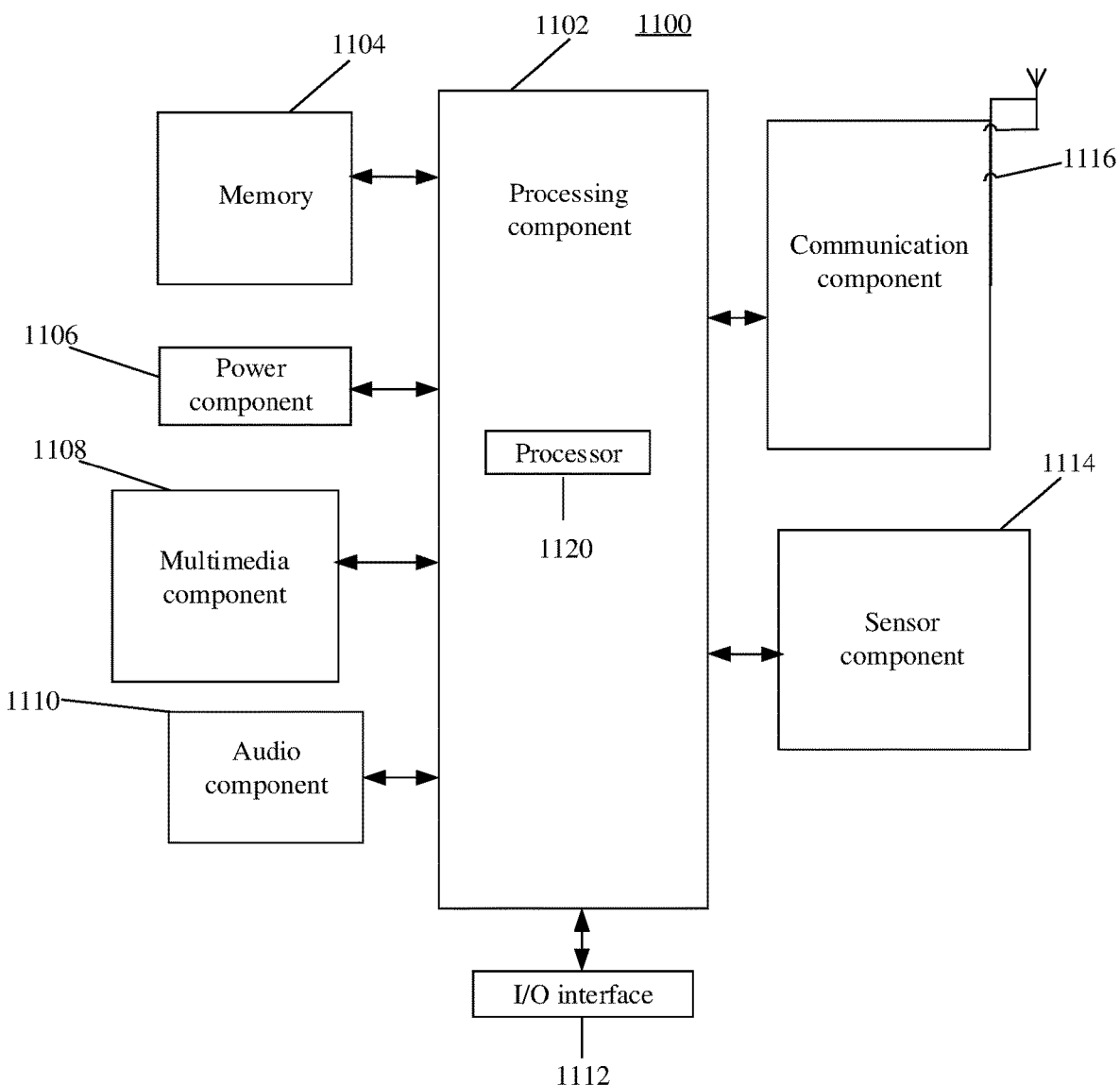
FIG. 11 is a block diagram showing an information reporting apparatus according to some embodiments of the present disclosure.

FIG. 11 is a block diagram of a device suitable for configuration of an information reporting apparatus, according to some embodiments of the present disclosure. For example, the device 1100 may be a mobile phone, a computer, a digital broadcast terminal, a messaging device, a gaming console, a tablet, a medical device, exercise equipment and a personal digital assistant.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the operations in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

One processor 1120 in the processing component 1102 may be configured to:

determine that an SCG failure occurs; and report information related to the SCG failure to the base station, where the information related to the SCG failure includes the location information of the UE.

The memory 1104 is configured to store various types of data to support the operation of the device 1100. Examples of such data include instructions for any application programs or methods operated on the device 1100, contact data, phonebook data, messages, pictures, video, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the device 1100. The power component 1106 may include a power management system, one or more power supplies, and other components associated with generation, management and distribution of power for the device 1100.

The multimedia component 1108 includes a screen providing an output interface between the device 1100 and a user. In some embodiments, the screen may include a Liquid Crystal Display (LCD) and a Touch Panel (TP). In some embodiments, an organic light-emitting diode (OLED) display or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the device 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and another device. The device 1100 may access a communication-standard-based wireless network, such as a Wireless Fidelity (Wi-Fi), 2G, 3G, 4G, 5G or a combination thereof. In some embodiments of the present disclosure, the communication component 916 receives a broadcast signal or broadcast associated information from an external broadcast management system through a broadcast channel. In some embodiments of the present disclosure, the communication component 1116 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including instructions, for example, a memory 1104 including instructions, which can be executed by the processor 1120 of the device 1100 to complete the above method. For example, the non-transitory computer-readable storage medium may be ROM, random access memory (RAM), CD-ROM, magnetic tape, floppy disk, and optical data storage device.

Figure 12:
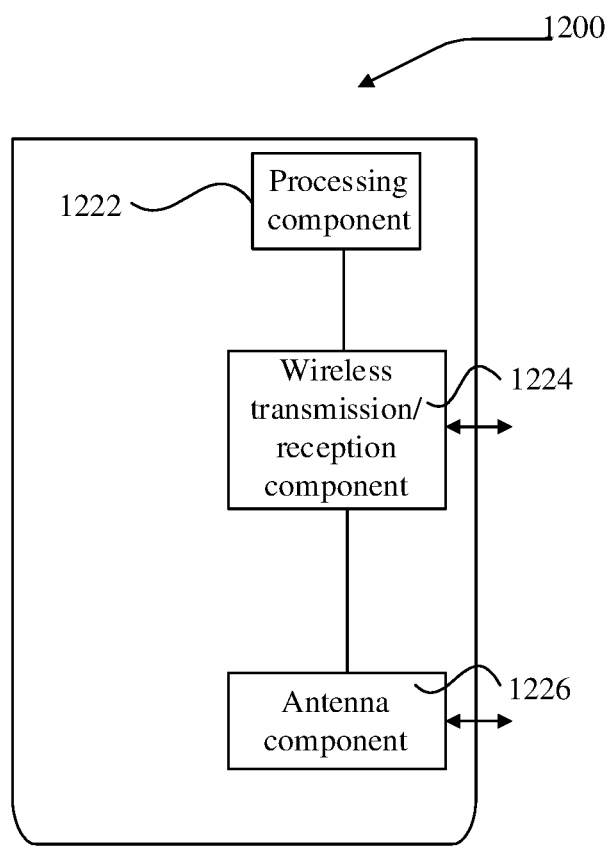
FIG. 12 is a block diagram showing a device suitable for information configuration according to some embodiments of the present disclosure.

FIG. 12 is a block diagram for information configuration apparatus according to some embodiments of the present disclosure. The device 1200 may be a base station. Referring to FIG. 12, the device 1200 includes a processing component 1222, a wireless transmission/reception component 1224, an antenna component 1226, and a signal processing part unique to a wireless interface. The processing component 1222 may further include one or more processors.

One of the processors in the processing component 1222 may be configured to:

determine that user equipment (UE) is in a connected state, and configure an SCG for the UE; and receiving information related to the SCG failure, which is reported by the UE when the SCG failure occurs, the SCG failure related information including the location information of the UE.

In some embodiments of the present disclosure, there is also provided a non-transitory computer-readable storage medium including instructions, which can be executed by the processing component 1222 of the device 1200 to perform the above information configuration method. For example, the non-transitory computer-readable storage medium may be ROM, random access memory (RAM), CD-ROM, magnetic tape, floppy disk, and optical data storage device.

Because the embodiment for a device basically corresponds to the embodiment for a method, therefore part of descriptions in these embodiments for the method can be consulted for parts which relate the embodiment for the device to the embodiment for the method. The above-mentioned embodiment for the device is merely schematic and herein units described as separate part can be separate with or connected to each other physically. Components displayed as the units can be physical units or non-physical units and can be located at one place or be scattered in multiple network units. Part or all of the portions can be chosen to implement the solutions in these embodiments of the disclosure according to an actual need. Those skilled in the art can understand and implement without making creative efforts.

It should be noted that relation terms such as "the first" and "the second" in the disclosure are merely used to distinguish an entity or an operation from another entity or another operation, and do not require that any actual relation or order should exist between the entities or operations or do not suggest that any actual relation or order exists between the entities or operations. The terms "comprise", "include" or any other variant is intended to include non-exclusive inclusion so that a process, a method, an article or a device of a series of elements include not only the elements but also other elements that are not explicitly listed or include elements inherent to the process, the article or the device. Without more restrictions, the elements limited by an expression "include one" do not exclude the situation that other same elements exist in the process, the method, the article or the device which includes the elements.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An information reporting method, executed by user equipment (UE) comprising a processor, and memory configured to store instructions executable by the processor, the method comprising:
   determining that a secondary cell group (SCG) failure occurs;
   reporting information related to the SCG failure to a base station, wherein the information related to the SCG failure includes location information of the UE; and
   receiving configuration information sent by the base station, wherein the configuration information comprises whether to report the location information of the UE when the SCG failure occurs;
   wherein the reporting the information related to the SCG failure to the base station comprises:
   reporting the information related to the SCG failure to the base station, in response to determining according to the configuration information that the location information of the UE is reported when the SCG failure occurs, wherein the configuration information further comprises whether to obtain global navigation satellite system (GNSS) location information when the location information of the UE is reported, wherein the method further comprises:

in response to determining according to the configuration information that the GNSS location information is obtained when the location information of the UE is reported, obtaining the GNSS location information, and adding the GNSS location information into the location information of the UE.

2. A mobile terminal implementing the method of claim 1, wherein the mobile terminal is the UE comprising a processor, and memory configured to store instructions executable by the processor, and the mobile terminal is configured to report the location information only after determining that the SCG failure occurs, thereby reducing reporting frequency of the location information and power consumption.

3. The mobile terminal of claim 2, further comprising a global navigation satellite system (GNSS) receiver configured to acquire a GNSS location when reporting the location information of the mobile terminal.

4. The mobile terminal of claim 3, further comprising a liquid crystal display (LCD) screen or an organic light-emitting diode (OLED) display screen.

5. A communication system comprising the mobile terminal of claim 2, further comprising the base station connected to the mobile terminal.

6. The communication system of claim 5, wherein the base station is configured to:

determine that the mobile terminal is in a connected state, and configure a secondary cell group (SCG) for the mobile terminal; and receive information related to an SCG failure, which is reported by the UE when the SCG failure occurs, the information related to the SCG failure comprising location information of the mobile terminal.

7. The communication system of claim 6, wherein the base station is further configured to:

generate configuration information, the configuration information comprising whether to report the location information of the mobile terminal when the SCG failure occurs; and send the configuration information to the mobile terminal, wherein the information related to the SCG failure is sent by the mobile terminal after it is determined, according to the configuration information, that the location information of the mobile terminal is reported when the SCG failure occurs.

8. The communication system of claim 7, wherein the configuration information further comprises whether to obtain the GNSS location when the location information of the mobile terminal is reported, wherein the information related to the SCG failure is sent by the mobile terminal after it is determined according to the configuration information that the GNSS location information is acquired when the location information of the mobile terminal is reported, the location information of the mobile terminal comprising the GNSS location information.

9. The communication system of claim 8, wherein by receiving the information related to the SCG failure, which includes the location information of the mobile and is reported by the mobile when the SCG failure occurs, the base station is configured not to instruct to report the location information of the mobile terminal in the measurement report configuration without the SCG failure, thereby reducing the power consumption of the mobile terminal.

10. An information configuration method, executed by a base station comprising a processor, and memory configured to store instructions executable by the processor, the method comprising:

determining that user equipment (UE) is in a connected state, and configuring a secondary cell group (SCG) for the UE;

receiving information related to an SCG failure, which is reported by the UE when the SCG failure occurs, wherein the Information related to the SCG failure comprises location information of the UE;

generating configuration information, wherein the configuration information comprises whether to report the location information of the UE when the SCG failure occurs; and sending the configuration information to the UE, wherein the information related to the SCG failure is sent by the UE after it is determined according to the configuration information that the location information of the UE is reported when the SCG failure occurs, wherein the configuration information further comprises whether to obtain global navigation satellite system (GNSS) location information when the location information of the UE is reported, and wherein the information related to the SCG failure is sent by the UE after it is determined according to the configuration information that the GNSS location information is acquired when the location information of the UE is reported, the location information of the UE including the GNSS location information.

11. An information reporting apparatus, comprising:

a processor; and memory configured to store instructions executable by the processor, wherein the processor is configured to:

determine that a secondary cell group (SCG) failure occurs;

report information related to the SCG failure to a base station, wherein the information related to the SCG failure comprises location information of the UE; and receive configuration information sent by the base station, wherein the configuration information comprises whether to report the location information of the UE when the SCG failure occurs, wherein in order to report the Information related to the SCG failure to the base station, the processor is configured to report the information related to the SCG failure to the base station, in response to a determination according to the configuration information that the location information of the UE is reported when the SCG failure occurs, wherein the configuration information further comprises whether to obtain global navigation satellite system (GNSS) location information when the location information of the UE is reported, and wherein the processor is further configured to:

in response to a determination according to the configuration information that the GNSS location information is obtained when the location information of the UE is reported, obtain the GNSS location information, and add the GNSS location information into the location information of the UE.

12. An information configuration apparatus, comprising:
a processor; and
memory configured to store instructions executable by the processor,
wherein the processor is configured to:
determine that UE is in a connected state, and configure a secondary cell group (SCG) for the UE;
receive information related to an SCG failure, which is reported by the UE when the SCG failure occurs, the information related to the SCG failure comprising location information of the UE;
generate configuration information, the configuration information comprising whether to report the location information of the UE when the SCG failure occurs; and
send the configuration information to the UE,
wherein the information related to the SCG failure is sent by the UE after it is determined, according to the configuration information, that the location information of the UE is reported when the SCG failure occurs,
wherein the configuration information further comprises whether to obtain global navigation satellite system (GNSS) location information when the location information of the UE is reported, and
wherein the information related to the SCG failure is sent by the UE after it is determined according to the configuration information that the GNSS location information is acquired when the location information of the UE is reported, the location information of the UE comprising the GNSS location information.

* * * * *